(12) United States Patent
Ferreira et al.

(10) Patent No.: US 8,751,482 B2
(45) Date of Patent: *Jun. 10, 2014

(54) KEYWORD EXPRESSION LANGUAGE FOR ONLINE SEARCH AND ADVERTISING

(75) Inventors: Ian P. Ferreira, Issaquah, WA (US); Ewa Dominowska, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/411,783

(22) Filed: Mar. 5, 2012

(65) Prior Publication Data

US 2012/0209701 A1    Aug. 16, 2012

Related U.S. Application Data

(62) Division of application No. 12/118,057, filed on May 9, 2008, now Pat. No. 8,145,620.

(51) Int. Cl.
*G06F 7/00* (2006.01)
*G06F 17/30* (2006.01)

(52) U.S. Cl.
USPC ........ 707/713; 707/728; 707/771; 705/14.43; 705/14.49; 705/14.54

(58) Field of Classification Search
USPC ....................................................... 707/713
See application file for complete search history.

(56) References Cited

U.S. PATENT DOCUMENTS

| 7,680,786 | B2 * | 3/2010 | Koran | 707/713 |
| 7,844,605 | B2 * | 11/2010 | Koran | 707/732 |
| 2005/0283473 | A1 * | 12/2005 | Rousso et al. | 707/5 |
| 2006/0004732 | A1 * | 1/2006 | Odom | 707/3 |
| 2007/0239716 | A1 | 10/2007 | Weininger et al. | |
| 2007/0244863 | A1 * | 10/2007 | Adams et al. | 707/3 |
| 2008/0071740 | A1 * | 3/2008 | Jhala et al. | 707/3 |
| 2008/0114607 | A1 * | 5/2008 | Amer-Yahia et al. | 705/1 |
| 2010/0036726 | A1 * | 2/2010 | Gallet | 705/14.43 |

FOREIGN PATENT DOCUMENTS

| JP | H04-340658 | 11/1992 |
| JP | 2004-118838 | 4/2004 |
| JP | 2005-063470 | 12/2004 |
| JP | 2007-279853 | 4/2006 |

OTHER PUBLICATIONS

First Examination Report Received in Australian Patent Application No. 2009244701, Mailed Mar. 14, 2014, 5 pages.

* cited by examiner

*Primary Examiner* — Binh V Ho
(74) *Attorney, Agent, or Firm* — Joann Dewey; Doug Barker; Micky Minhas

(57) ABSTRACT

Media and methods are provided for creating and operating a keyword expression language. Syntax is generated as an abbreviation to represent a list of keywords. The syntax is executed as part of the keyword expression language to provide keywords. The syntax includes tokens that substitute for groups of information. Advertisers generate syntax which is subsequently used by a third-party to match to search queries and ads. The third-party may also generate keywords to match to the search queries and ads. The keywords are used to trigger advertising over the Internet.

8 Claims, 6 Drawing Sheets

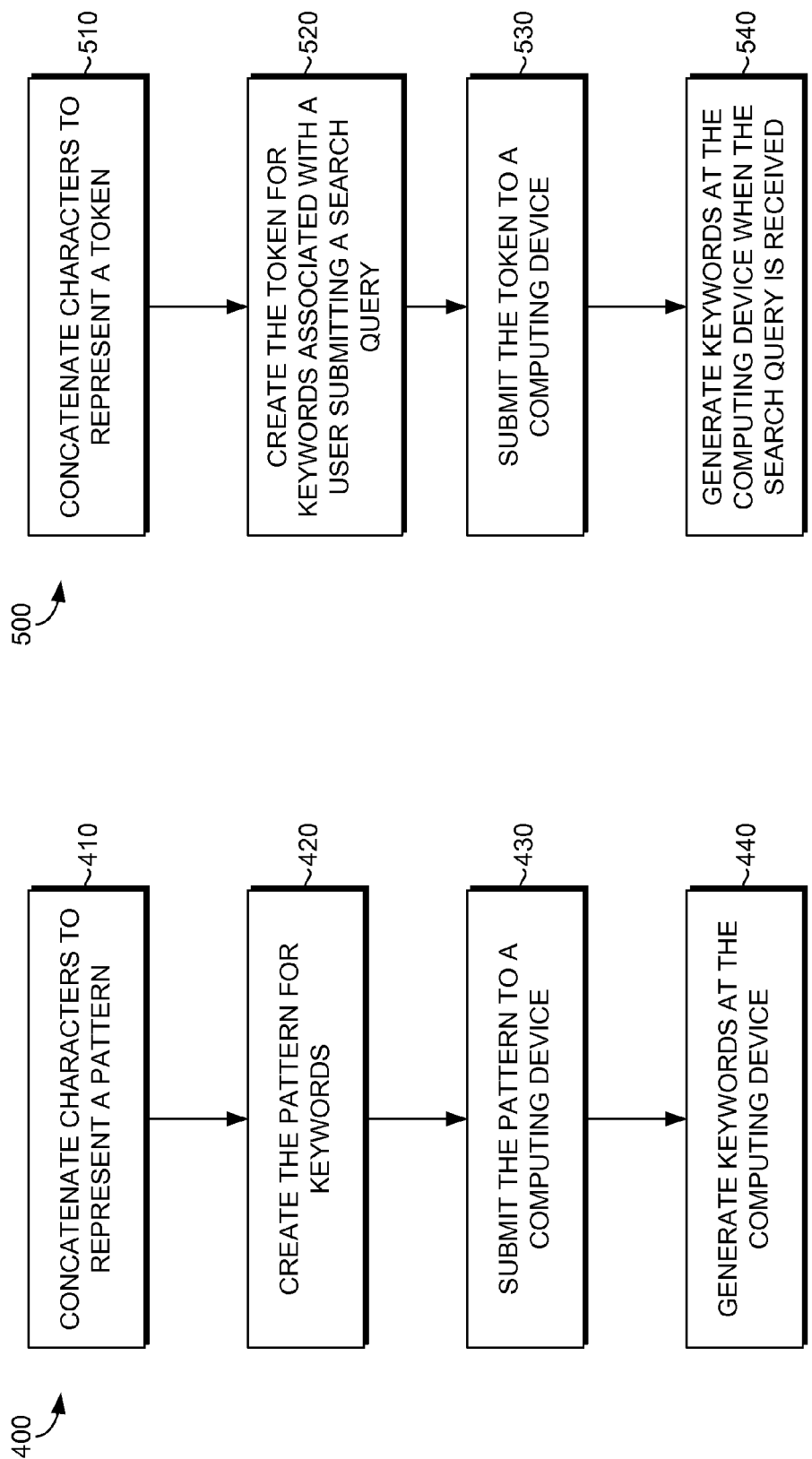

KEYWORD EXPRESSION LANGUAGE FOR ONLINE SEARCH AND ADVERTISING

CROSS-REFERENCE TO RELATED APPLICATIONS

This application is a divisional of U.S. patent application Ser. No. 12/118,057, filed May 9, 2008, which is incorporated herein in its entirety by this reference thereto.

STATEMENT REGARDING FEDERALLY SPONSORED RESEARCH OR DEVELOPMENT

Not applicable.

BACKGROUND

In online search, users often have a need that can be met through a number of different web pages. The information or commercial need of the user can often be described by a concept or a set of concepts with a set of constraints. However, most search engines require users to try finding information by knowing what phrases might frequently appear on the page.

Similarly, in online advertising, advertisers have to provide long lists of keywords or phrases that they hope the user would type as part of the query when searching for their products. Even with the advertisers' efforts, some keywords are unique and hard to use for ad targeting. For example, a product SKU can be forgotten when generating the keyword list. Further, the product SKU may be hard to use for searching.

SUMMARY

The present invention is defined by the claims below. Embodiments of the present invention solve at least the above problems by providing media and methods for executing a keyword expression language to match keyword expression language syntax to search queries and ads, generating keywords from a pattern using the keyword expression language, and generating keywords from a token using the keyword expression language.

A keyword expression language greatly simplifies the way advertisers target users. The keyword expression language provides users with a simpler way to search using more general concepts. The keyword expression language allows an advertiser to submit characters to a publisher rather than submit complete lists of keywords. The publisher can match the characters or words that come from the characters to search queries and ads. The publisher can also generate keywords from the characters, and the keywords relate to ads provided by the advertiser. The submission of the characters reduces the effort that the advertiser spends on keyword generation. Rather than the advertiser generating the keywords, the publisher uses the characters or generates the keywords. The keywords are generated through a permutation of the characters. Within the keyword expression language, the characters may be expressed as keyword expression language syntax or token syntax.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 4 is a flowchart of an exemplary process for generating keywords from a pattern using a keyword expression language when practicing an embodiment of the present invention;

FIG. 5 is a flowchart of another exemplary process for generating keywords from a token using a keyword expression language when practicing an embodiment of the present invention.

DETAILED DESCRIPTION

Figure 1:
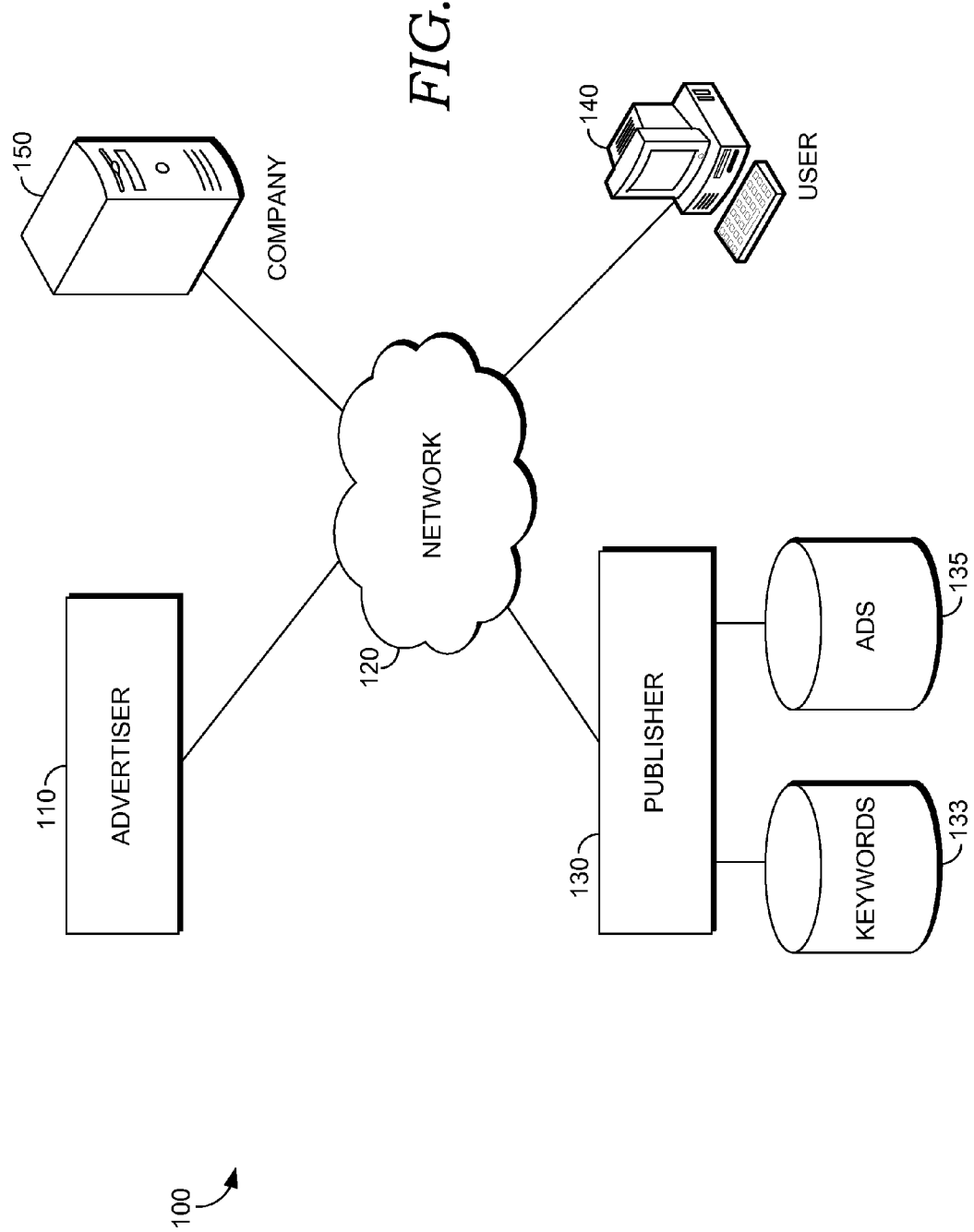
FIG. 1 is a block diagram of an exemplary operating environment implementing an embodiment of the present invention.

Embodiments of the present invention provide media and methods for executing a keyword expression language to match keyword expression language syntax to search queries and ads, generating keywords from a pattern using the keyword expression language, and generating keywords from a token using the keyword expression language.

Many different arrangements of the various components depicted, as well as components not shown, are possible without departing from the spirit and scope of the present invention. Embodiments of the present invention will be described with the intent to be illustrative rather than restrictive. Alternative embodiments will become apparent to those skilled in the art. A skilled artisan may develop alternative means of implementing improvements without departing from the scope of the present invention.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to Random Access Memory (RAM), Read-Only Memory (ROM), Electrically Erasable Programmable Read-only Memory (EEPROM), flash memory or other memory technology, Compact Disc-Read-Only Memory (CD-ROM,) digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Keyword Expression Language

In an implementation of an embodiment of the present invention, a keyword expression language is provided. With the keyword expression language, an advertiser can use regular expression-type syntax keyword sets like Panasonic® TD-H{a-b}+{0-9}*. Similarly, a user can look for all models of the Canon® PowerShot® cameras by issuing a query of the form: Canon® PowerShot® {A-Z}+{0-9} {0-9} {0-9}*. In addition, the keyword expression language standard provides sets of tokens that represent a set of related keywords. For example, {gender} and {location} are interpreted as the complete set of keywords belonging to the token class. {gender} matches with "male", "female", "women", "boy", "man", "girl", and so on.

The keyword expression language chaining and constraining of concepts. For example, {location<Europe} means that the token can be substituted by any location as long as the location is contained within Europe. {location:city} means that the token can be substituted by any location as long as the location is a city.

In a first aspect, media having computer instructions embodied thereon performs a method for executing a keyword expression language to match keyword expression language syntax to search queries and ads. Letters with symbols are received to represent an instance of the keyword expression language. The instance represents a combination of the letters with the symbols or a subset of the letters with the symbols. The instance is associated with ads. The instance is stored in a database.

In another aspect, media having computer instructions embodied thereon performs a method for executing a keyword expression language to generate keywords for a search. Letters with symbols are received from an advertiser to represent an instance of the keyword expression language. A set of keywords is generated from permutations of the instance. The set of keywords is associated with ads. The set of keywords is stored in a database.

In yet another aspect, a method for generating keywords from a pattern using a keyword expression language is provided that includes concatenating characters to represent the pattern. The pattern is created for a set of related keywords. The pattern is submitted to a computing device. The computing device generates the set of related keywords.

In yet another aspect, a method for generating keywords from a token using a keyword expression language is provided that includes concatenating characters to represent the token. The token is created for a set of related keywords associated with a user submitting a search query. The token is submitted to a computing device. The computing device generates the set of related keywords when the search query is received.

In FIG. 1, an operating environment 100 is provided with an advertiser 110, a publisher 130, a user 140 and a company 150 connected to a network 120. Advertiser 110, like publisher 130, user 140 and company 160, has a communication connection to network 120. This connection may vary depending upon an implementation of an embodiment but typically includes connections found with the Internet. Advertiser 110 represents an entity, such as a company or organization, which desires to provide advertising to a user. Although used in the singular in the context here, advertiser 110 may represent one advertiser or several advertisers that desire to advertise their products or services over network 120. Advertiser 110's goal is to reach as many users that are connected to network 120.

In order to reach users, advertiser 110 has a relationship with publisher 130 which is connected to network 120. Publisher 130 may be a service such as an ad center which takes keyword expression language syntax, keywords, and advertisements from advertisers and publishes them across network 120. Publisher 130 stores the keyword expression language syntax and keywords in a data store such as keyword 133 and stores advertisements in a data store such as ads 135. Keyword 133 and ads 135 may be a data store such as a database, memory, or other data storage device.

Publisher 130 may implement various schemes to enable an advertiser to have its ad published on a website. For example, publisher 130 may provide an auction whereby advertisers bid for advertising space on particular websites. Publisher 130 may implement other schemes or programs to enable advertisers to have their ads published at websites.

Publisher 130 can implement the keyword expression language to use the syntax or to generate various keywords for advertiser 110. In implementing an embodiment of the present invention, advertiser 110 can provide a few letters and symbols to function as instances in the keyword expression language. The instances are syntax of the keyword expression language and may include letters, characters, or symbols that provide a word abbreviation which allows advertiser 110 to provide minimum information to publisher 130. Publisher 130 takes the instances and either use the instances directly or generates permutations of keywords desired by advertiser 110. Advertiser 110 no longer has to provide an enormous long list of keywords but may rely on publisher 130 to use the instances or generate the keywords. A benefit of the shift from advertiser 110 to publisher 130 for the generation of the keywords is that keywords are not inadvertently missed or omitted. Furthermore, advertiser 110 does not have to spend a lot of time on keyword generation but can now provide abbreviated information to publisher 130. Publisher 130 can generate the long list of keywords, which may number in the thousands, and store them in keyword 133 or use the instances as a representation of the keywords.

Advertiser 110 supplies publisher 130 with ads that advertiser 110 would like to be displayed to users. Ads from advertiser 110 are stored in ads 135. As discussed above, the connection from advertiser 110 through network 120 to publisher 130 can occur in a network such as the Internet. However network 120 can also include other types of network such as a local area network, a wireless area network, or a wired area network.

Company 150 is a representation of an entity, such as a company or an organization, which has a website that is accessible over the Internet. Although not shown here, company 150 may have various web servers located across network 120. The web servers provide web pages that can be accessed by users.

User 140 can access the web page that is created and provided by company 150 over network 120. For example, user 140, as shown in FIG. 1, may desire to access a travel website. Company 150 can be a travel company that provides a web page from one of its servers. User 140 can be a computing device with an interface for a person to access destinations over network 120. As user 140 executes a link or uniform resource locator (URL) for the web page, the web page from company 150 is accessed and displayed to user 140.

Oftentimes, companies or organizations, like company 150, want to sell advertising space on their websites. As a result, ads can appear on the website of company 150 when accessed by user 140. Depending on the relationship between company 150 and publisher 130, these ads can change periodically every time user 140 accesses the website. In FIG. 1, when user 140 accesses the webpage of company 150, publisher 130 provides the accompanying ad that is displayed in the webpage that is shown to user 140.

In another implementation of an embodiment of the present invention, a particular ad may be shown when the user provides a search query into a search engine. In a scenario, user 140 wants to know some information about snow skis. User 140 types a search query of the term or phrase "snow skis". The search engine may operate from the web server of company 150, publisher 130, or another third-party. When user 140 submits the query, the search engine returns results based on the search query for "snow skis". To user 140, the details of the process are transparent. However, before the time the search query is received by the search engine, advertiser 110 provides an instance of the word "skis" that may look like "ski{a-z}". Publisher 130 receives the phrase "snow ski{a-z}". Publisher 130 parses information searching for all permutations of the term "snow skis". If the terms are found, publisher 130 matches the located term or terms with an ad related to the permutated terms. Or, publisher 130 can match the search query to any combination of words that can occur from the instance. If a possibility of a match can occur, publisher 130 matches the matched item to the ad.

Figure 2A:
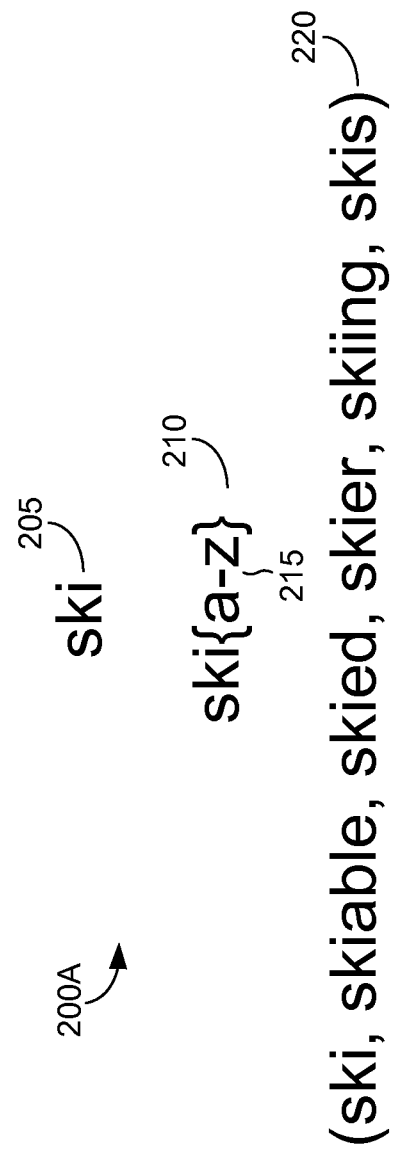
FIG. 2A is an illustration of an exemplary syntax and results when implementing the keyword expression language in an embodiment of the present invention.

Turning now to FIG. 2A, an exemplary syntax 200A is shown with a word 205, an instance 210, and results 220. In implementing an embodiment of the keyword expression language, the word "ski" in word 205 can be used to create permutations all of the word "ski". In order to accomplish this permutation, instance 210 is written with the letters "ski" and symbols 215. Symbols 215 represent an abbreviation for the various appendages to the word "ski". When the keyword expression language is executed, results 220 is created with the words "ski", "skiable", "skied", "skier", "skiing", and "skis". Whereas in the past, advertiser 110 had to provide the keywords to publisher 130, now, advertiser 110 provides only instance 210 to publisher 130. Publisher 130 can make the permutations to provide result 220.

Exemplary syntax used in the keyword expression language includes, but is not limited to, the following:

| - | To define ranges |
|---|---|
| { } | To define sets |
| , | To define possible options |
| = | To define 0 or more occurrences of the previous character |
| * | To define 1 or more occurrences of the previous character |

-continued

| {0-9} | Any numeric character |
|---|---|
| {a-z} | Any lower case alpha character |
| {a-Z} | Any alpha character |
| {0-Z} | Any alpha numeric character |

Examples of using the keyword expression language syntax include the following:

Panasonic® TH-HD{0-1} {a-b}
Panasonic® T{H,B,D}55.*

Figure 2B:
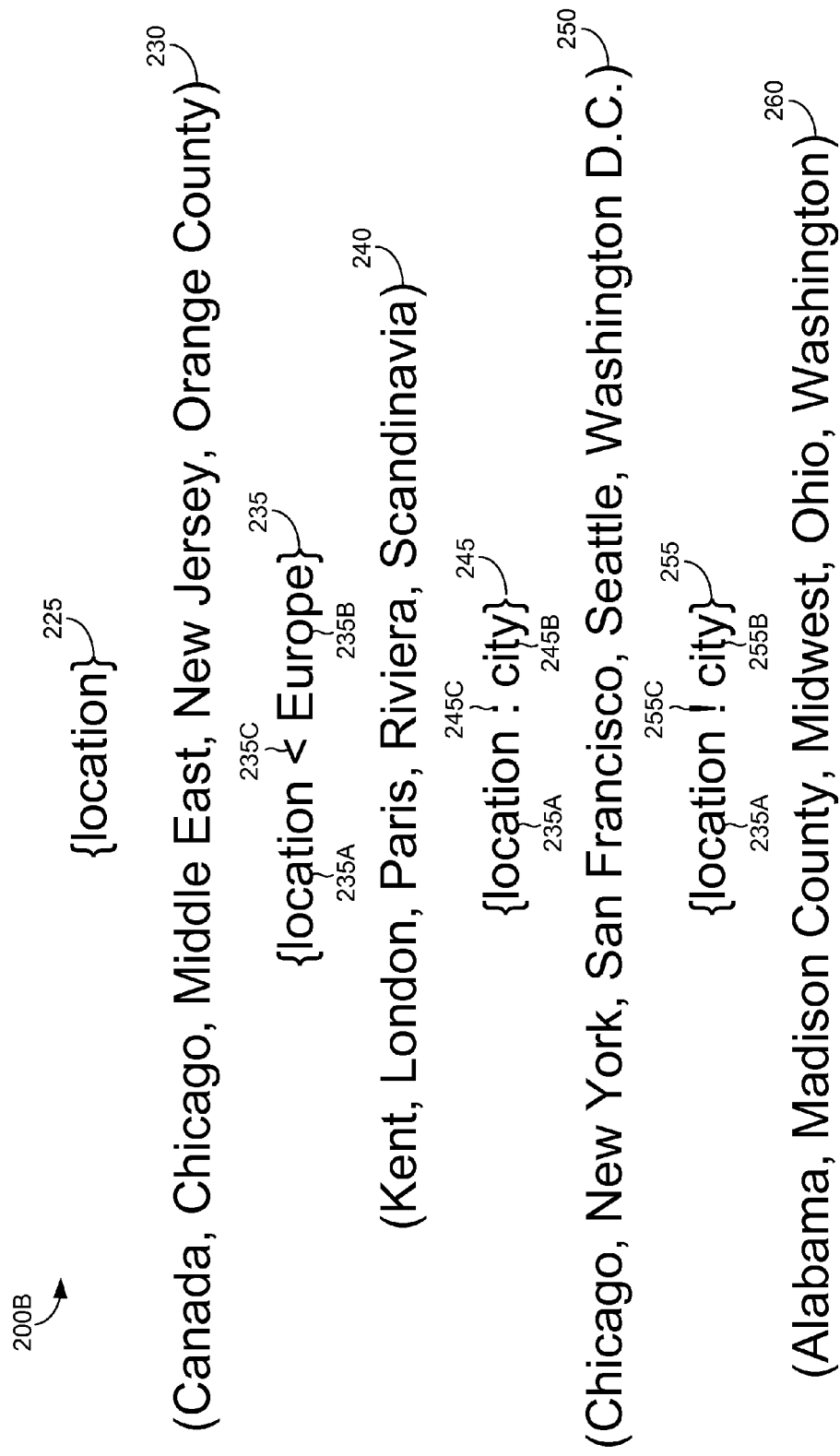
FIG. 2B is an illustration of exemplary tokens and results when implementing the keyword expression language in an embodiment of the present invention.

FIG. 2B illustrates another syntax 200B implementing an embodiment of the keyword expression language. Syntax 200B illustrates various tokens that operate with the keyword expression language. In FIG. 2B, a token 225 is shown with a first result 230. In implementing an embodiment of the present invention, the keyword expression language provides for tokens to be used as an abbreviation for various entries. In token 225, the term "location" is used as a placeholder for information that may be populated later, such as result 230. As shown with token 225, the term "location" results in first result 230 having the words "Canada", "Chicago", "Middle East", "New Jersey", and "Orange County".

Continuing with FIG. 2B, token syntax 235 is shown with a token 235A, a token 235B, and an operator 235C. Operator 235C provides a constraining rule for token syntax 235 whereby all objects of token 235A that belong to a subset of token 235B. For token syntax 235, an execution of the keyword expression language provides a result that includes all locations that are in Europe. In FIG. 2B, the result would be a second result 240 having the words "Kent", "London", "Paris", "Riviera", and "Scandinavia".

Token syntax 245 is shown with token 235A, a token 245B, and an operator 245C. Operator 245C provides a constraining rule for token syntax 245 whereby all objects of token 235A belonging to token 245B. For token syntax 245, an execution of the keyword expression language provides a result that requires all locations to be a city. In FIG. 2B, the result would be a third result 250 having the words "Chicago", "New York", "San Francisco", "Seattle", and "Washington, D.C.".

Token syntax 255 is shown with token 235A, a token 255B, and an operator 255C. Operator 255C provides a constraining rule for token syntax 255 whereby all objects of token 235A that are not in token 255B. For token syntax 255, an execution of the keyword expression language provides a result that includes all locations that are not a city. In FIG. 2B, the result would be a fourth result 260 having the words "Alabama", "Madison County", "Midwest", "Ohio", and "Washington".

Figure 3:
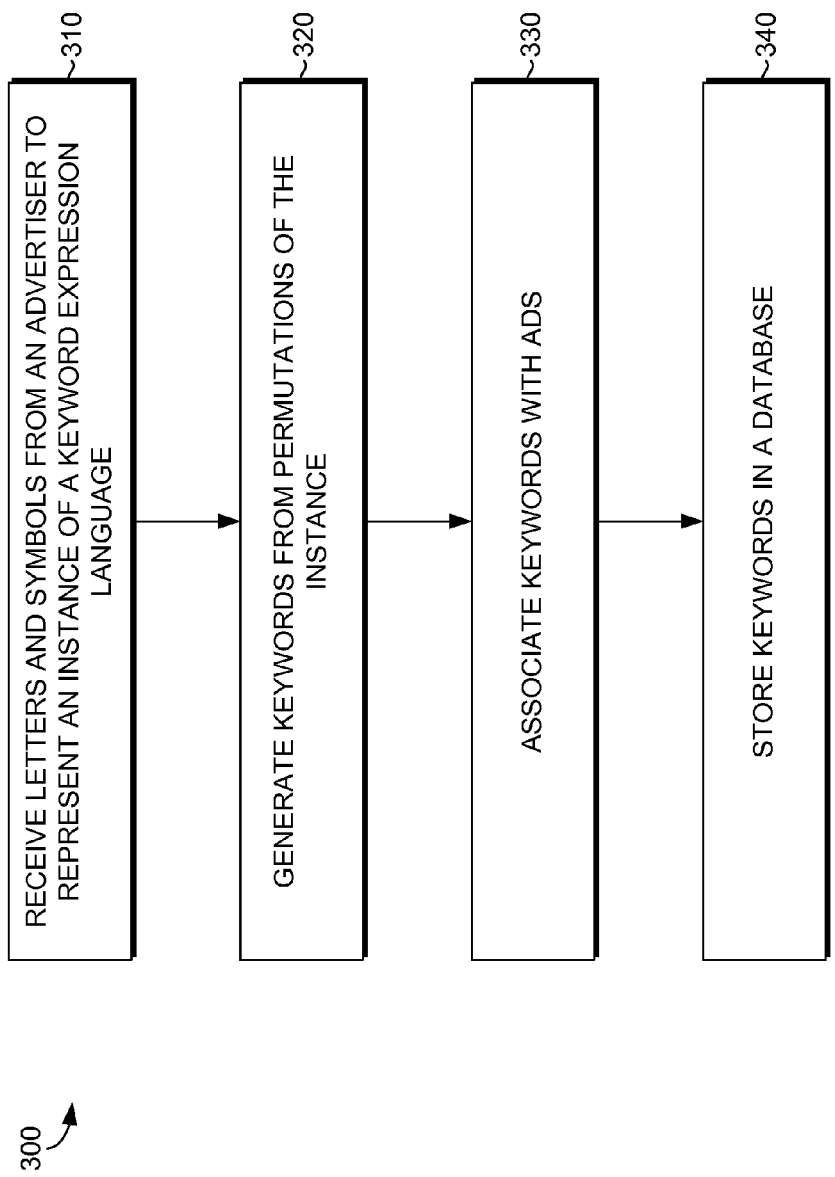
FIG. 3 is a flowchart of an exemplary process for executing a keyword expression language to generate keywords for a search when practicing an embodiment of the present invention.

Turning now to FIG. 3, a process for executing a keyword expression language to generate keywords for a search is shown in a method 300. In a step 310, letters and symbols are received from advertiser 110 to represent instance 210 of the keyword expression language. As shown in FIG. 1, advertiser 110 sends letters and symbols that represents instance 210 to publisher 130. In a step 320, publisher 130 generates keywords from the permutation of instance 210. The resulting keywords are stored in keyword 133. In a step 330, publisher 130 associates the keywords with ads that are stored in ads 135. In a step 340, the generated keywords are stored in keyword 133.

In FIG. 4, a process for generating keywords from a pattern using the keyword expression language is shown in a method 400. In a step 410, characters are concatenated together to represent a pattern similar to instance 210 in FIG. 2A. Various characters can be placed together to form various patterns. Although one pattern is shown with instance 210, several instances may be linked together to create a single pattern or multiple patterns. In a step 420, the pattern is created for keywords (results 220) as shown in FIG. 2A. In a step 430, the pattern is submitted to a computing device such as one found at publisher 130. The computing device may vary and can include, but is not limited to, computers, workstations, laptops, and servers. In a step 440, the keywords are generated at the computing device (publisher 130). As discussed above, instance 210 would be sent from advertiser 110 to publisher 130 where results 220 would be created.

In FIG. 5, a process for generating keywords from a token using the keyword expression language is provided in a method 500. In a step 510, characters are concatenated together to represent a token such as token 225. In a step 520, token 225 is created for keywords associated with a user that is submitting a search query. In a step 530, token 225 is submitted to a computing device. The computing device can be located at publisher 130 or at company 150 depending on the implementation of an embodiment of the present invention. In a step 540, keywords are generated at the computing device when the search query is received rather than being created in advance.

It is noted that token 225 may be executed at various locations including publisher 130 or company 150. Typically, results like first results 230 occur when user 140 submits a search query including token 225. The idea here is to convey that tokens are used as placeholders for information that is generated at the time the search query is submitted. This information can be generated based upon external factors. For example, user 140 may be located in a particular area and desires to know something about a certain set of companies. For example, user 140 may be located in Montana and desires to locate the ski lodges that are in the area. User 140 may use token 225 with the term "location" within a search query phrase such as "{location} of all ski lodges". This search query would return the ski lodges in the area. The results from this search query are based on user 140's physical location. Other tokens may be used can be based on a variety of other factors. Rules can be established to create results from those factors. Exemplary tokens include the following:

| | |
|---|---|
| Location | Provides the location of the user. New York |
| Gender | Provides a particular gender. Female |
| DatePart | Provides a time or part of the day. Afternoon |
| Date | Provides the current date. |
| Class | Provides results for the topical category of the query. |
| City | Provides the city of the user. |
| Country | Provides the country of the user. |
| Month | Provides the current month. |
| State | Provides the state of the user. |

Exemplary phrases that incorporate tokens in the keyword expression language include the following:

| | |
|---|---|
| Hotels near {location} | Hotels near New York. |
| The best car for {gender}s | The best car for males. |
| Buy {class} on e-bay | Buy cameras on eBay ®. |

Figure 6:
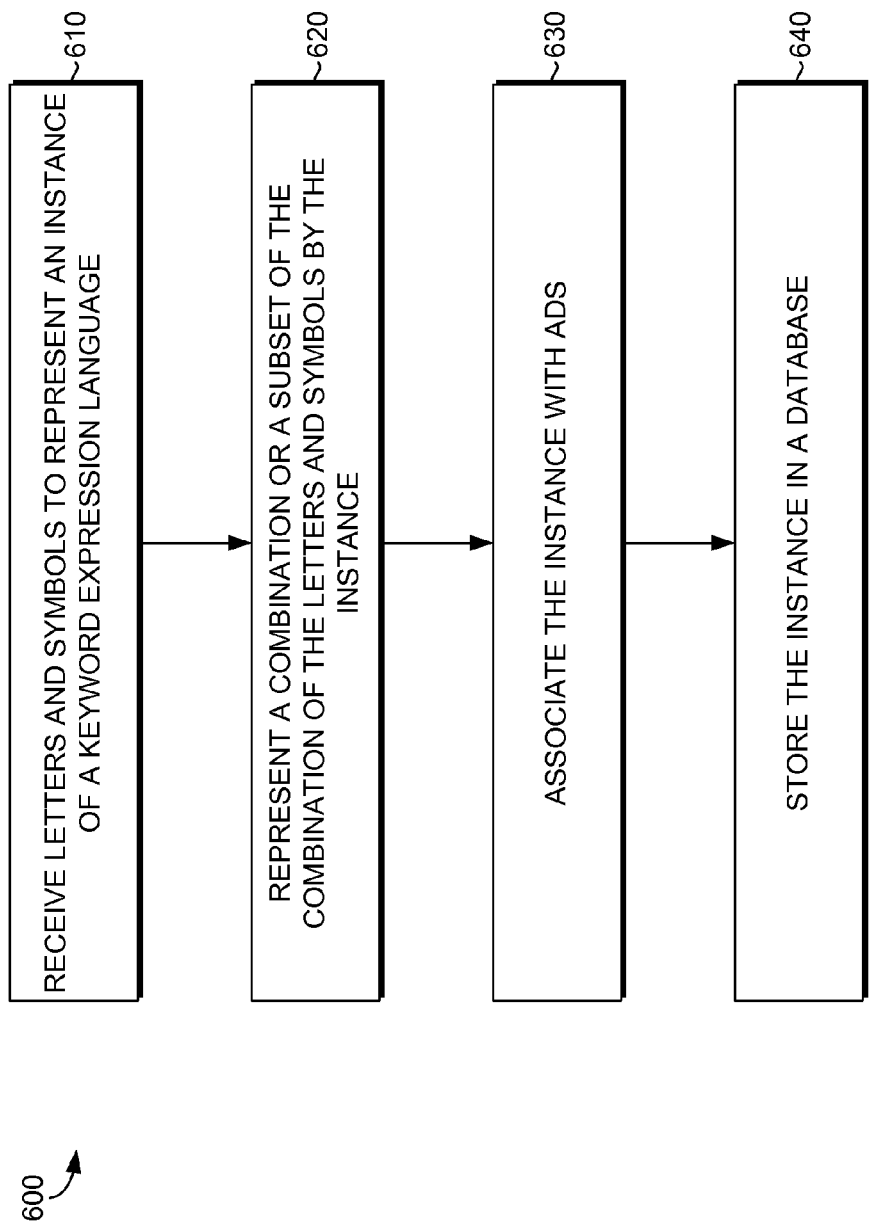
FIG. 6 is a flowchart of an exemplary process for executing a keyword expression language to match keyword expression language syntax to search queries and ads when practicing an embodiment of the present invention.

Turning now to FIG. 6, a process for executing a keyword expression language to match a keyword expression language syntax to search queries and ads is shown in a method 600. In a step 610, letters and symbols are received from advertiser 110 or user 140 to represent instance 210 of the keyword expression language. In a step 620, instance 210 can represent a combination of the letters and symbols or a subset of the combination of the letters and symbols. Rather than create a permutation of instance 210 to generate keywords, instance 210 is used directly to represent all possible outcomes of words that may spring from instance 210. In a step 630, instance 210 is associated with ads stored in ads 135. This means the ads are associated with all possible outcomes of words that may be produced from instance 210. In a step 640, unlike step 340, the actual instance 210 is stored in a database. Instance 210 may be stored in keyword 133 or another database.

The prior discussion is only for illustrative purposes to convey exemplary embodiments. The steps discussed in FIGS. 3-5 may be executed without regards to order. Some steps may be omitted and some steps may be executed at a different time than shown. For example, step 340 may be executed before step 330. The point here is to convey that the figures are merely exemplary for the embodiments of the present invention and that other embodiments may be implemented for the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable storage media having computer instructions embodied thereon for performing a method for executing a keyword expression language to match keyword expression language syntax to search queries and ads, the method comprising:
   receiving one or more letters with one or more symbols to represent an instance of the keyword expression language, wherein a combination of the one or more letters with the one or more symbols or a subset of the combination of the one or more letters with the one or more symbols is also represented by the instance;
   associating the instance with one or more ads;
   storing the instance in a database; and
   executing the keyword expression language with a set of tokens, wherein a token represents a group of related keywords.

2. The media of claim 1, wherein receiving the one or more letters with the one or more symbols comprises receiving from an advertiser or a user the one or more letters with the one or more symbols.

3. The media of claim 2, further comprising
   generating a set of keywords from one or more permutations of the instance; and
   associating the set of keywords with the one or more ads.

4. The media of claim 3, further comprising providing the one or more ads to a computing device of the user when a match occurs between a search query and the instance or the match occurs between the search query and a member of the set of keywords.

5. The media of claim 4, further comprising:
   receiving the search query from the computing device operated by the user;
   matching the query to the member of the set of keywords; and
   based on the match, providing one of the one or more ads to the computing device wherein the one of the one or more ads is displayed to the user.

6. The media of claim 1, further comprising receiving one or more words with the one or more letters and the one or more symbols to represent the instance.

7. The media of claim 6, wherein the keyword expression language includes keywords expressed as patterns.

8. The media of claim 6, wherein the group of related keywords is derived from an aspect about a user.

* * * * *